United States Patent
Pflügner et al.

(10) Patent No.: US 6,948,728 B2
(45) Date of Patent: Sep. 27, 2005

(54) SUSPENSION STRUT BEARING FOR A SUSPENSION STRUT

(75) Inventors: Wolfgang Pflügner, Herzogenaurach (DE); Alexander Zernickel, Herzogenaurach (DE); Herbert Erhardt, Herzogenaurach (DE); Jürgen Weiss, Herzogenaurach (DE)

(73) Assignee: INA-Schaeffler KG, Herzogenaurach (DE)

( * ) Notice: Subject to any disclaimer, the term of this patent is extended or adjusted under 35 U.S.C. 154(b) by 0 days.

(21) Appl. No.: 10/174,542

(22) Filed: Jun. 17, 2002

(65) Prior Publication Data

US 2003/0002764 A1 Jan. 2, 2003

Related U.S. Application Data

(63) Continuation of application No. PCT/EP00/11327, filed on Nov. 16, 2000.

(30) Foreign Application Priority Data

Dec. 16, 1999 (DE) .......................................... 199 60 699

(51) Int. Cl.⁷ .............................................. B60G 15/07
(52) U.S. Cl. .............................. 280/124.147; 267/220; 267/221; 384/607; 384/611
(58) Field of Search .................. 280/124.147, 124.155; 267/220, 221; 384/607, 609, 611, 615

(56) References Cited

U.S. PATENT DOCUMENTS 4,541,744 A * 9/1985 Lederman ................... 384/607
4,699,530 A   10/1987 Satoh et al.
4,948,272 A * 8/1990 Stowe ........................ 384/607
5,467,971 A * 11/1995 Hurtubise et al. ..... 280/124.147
5,664,892 A   9/1997 Kellam
6,257,605 B1 * 7/2001 Zernickel et al. ..... 280/124.147

FOREIGN PATENT DOCUMENTS

| DE | 26 58 748 C2 | 6/1978 |
|---|---|---|
| DE | 29 13 982 A1 | 10/1979 |
| DE | 690 01 377 T2 | 7/1993 |
| DE | 197 52 268 A1 | 5/1999 |
| DE | 197 52 269 A | 5/1999 |
| DE | 198 09 074 A1 | 7/1999 |
| FR | 2 375 484 A | 7/1978 |
| FR | 2 779 096 A1 | 12/1999 |
| WO | WO 89/05242 A1 | 6/1989 |

* cited by examiner

Primary Examiner—Peter C. English
(74) Attorney, Agent, or Firm—Henry M. Feiereisen

(57) ABSTRACT

A suspension strut used in a wheel suspension of an automotive vehicle, includes a shock absorber, a suspension strut bearing, and a coil spring at least partially coaxially surrounding the shock absorber and having one spring end supported by the shock absorber. The suspension strut bearing includes two plastic carrier elements, and a roller bearing positioned between the carrier elements. One carrier element is a guide ring connected to a vehicle body of the vehicle, and the other carrier element is a single-piece housing having incorporated therein plural hollow chambers in partial concentric surrounding relationship to the shock absorber and formed with a guide collar and a support surface for supporting the other end of the coil spring. The guide ring has a radially inner collar and a radially outer collar which together receive the roller bearing and extend at least beyond a midsection of the roller bearing.

25 Claims, 4 Drawing Sheets

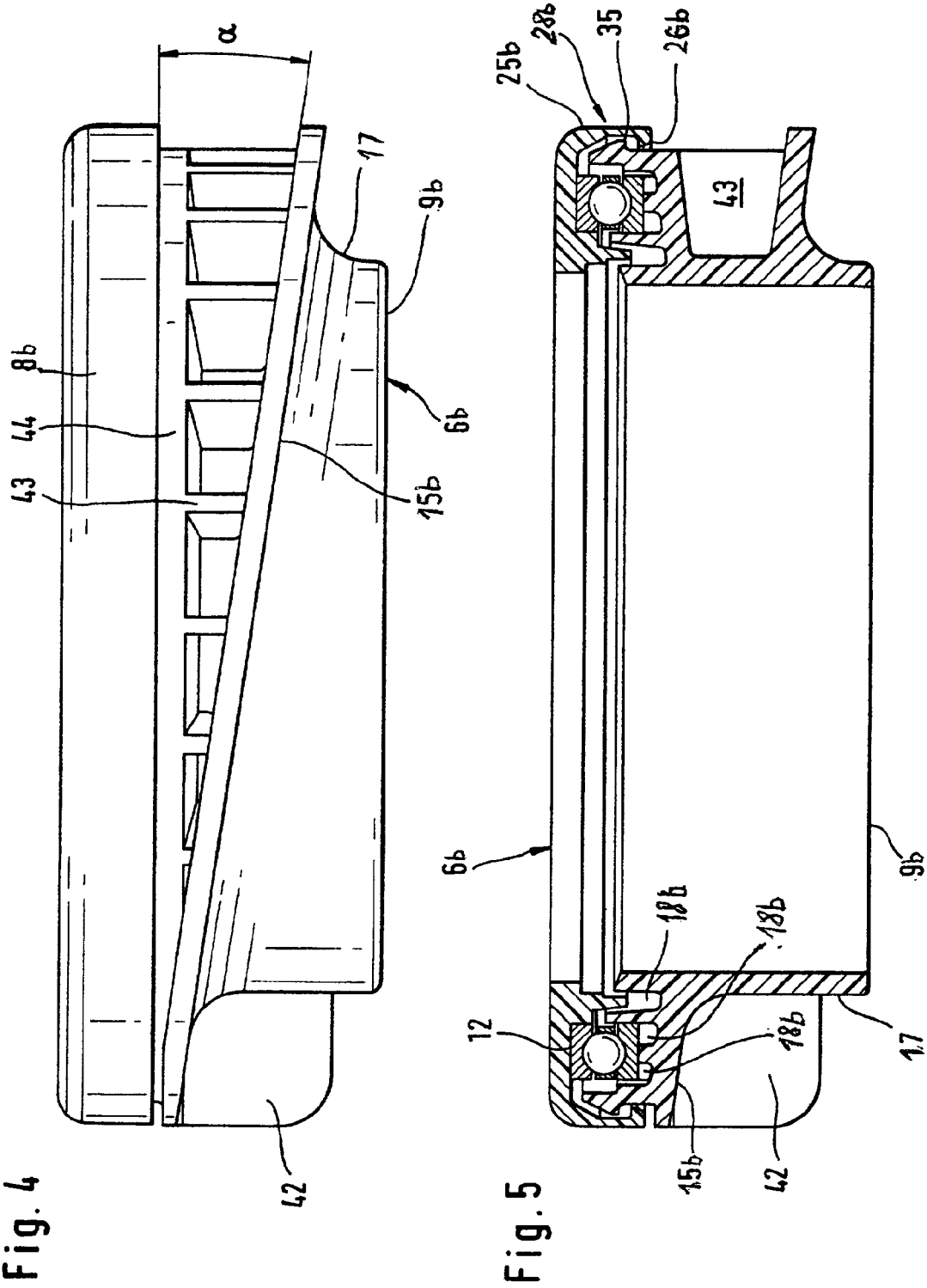

SUSPENSION STRUT BEARING FOR A SUSPENSION STRUT

CROSS-REFERENCES TO RELATED APPLICATIONS

This application is a continuation of prior filed copending PCT International application no. PCT/EP00/11327, filed Nov. 16, 2000.

This application claims the priority of German Patent Application Ser. No. 199 60 699.4, filed Dec. 16, 1999, pursuant to 35 U.S.C. 119(a)–(d).

BACKGROUND OF THE INVENTION

The present invention relates, in general, to a suspension strut for use in a wheel suspension of an automotive vehicle, and more particularly to a suspension strut bearing for a suspension strut.

The wheel suspension or wheel control for each of the steered front wheels of motor vehicles includes a suspension strut which includes a telescopic shock absorber and a coil spring which operates a wheel spring and is disposed in surrounding relationship to the shock absorber. The shock absorber and the coil spring are supported elastically by the vehicle body and are borne together in a suspension strut bearing with respect to the vehicle body for rotation about their longitudinal axis. The suspension strut bearing allows a rotation between the shock absorber and the attached spring disk, on the one hand, and the vehicle body, on the other hand, when the wheel are turned for steering purposes. The further spring end of the coil spring is so supported by the shock absorber as to be constraint against rotation. The resistance against turning can be kept small by incorporating a roller bearing in the suspension strut bearing in order to enhance the steering comfort and to prevent an inadvertent spring torsion and resultant return moments.

A wheel control or suspension for front wheels is described in German Pat. No. DE 29 13 982. The wheel suspension has a shock absorber with a piston rod whose upper bearing journal has attached thereon an axial roller bearing to ensure a rotation of the suspension strut relative to the vehicle body. The lower ring of the axial roller bearing is supported via a spring disk by the piston rod of the shock absorber as well as by the associated coil spring. Forces applied by the shock absorber and the coil spring and acting on the roller bearing are transmitted from the roller bearing via an elastic support bearing onto the vehicle body.

German patent publication DE 197 52 268 describes a suspension strut bearing having two carrier elements and a roller bearing positioned between the carrier elements. A first one of the carrier elements is secured to the vehicle body so as to be constraint against rotation and has fitted therein a bearing ring of the roller bearing. The first carrier element has a rotation-symmetrical, circular ring shaped configuration and has on the outside an axially projecting wall which extends over the entire assembly height of the roller bearing. On its free end, the wall of this rotation-fixed carrier element engages behind a radially outwardly directed collar of the second carrier element for placement of a second bearing ring. The second carrier element is made of sheet steel and has a roller bearing distal side which supports on the outside the coil spring of the suspension strut. The suspension strut is further provided with a damping element for realizing an elastic end stop at severe spring compression.

It would be desirable and advantageous to provide an improved suspension strut bearing which is cost-efficient and which is compact in structure and weight-optimized while exhibiting improved stiffness.

SUMMARY OF THE INVENTION

According to one aspect of the present invention, a suspension strut used in a wheel suspension of an automotive vehicle, includes a shock absorber, a suspension strut bearing defining a longitudinal axis, and a coil spring arranged at least in part in coaxial surrounding relationship to the shock absorber and having opposite spring ends, one spring end supported by an abutment of the shock absorber, wherein the suspension strut bearing includes a pair of carrier elements made of plastic material, and a roller bearing positioned between the carrier elements, one of the carrier elements configured as a guide ring connected to a body of the vehicle, and the other carrier element configured as a single-piece housing having incorporated therein plural hollow chambers in partial concentric surrounding relationship to the shock absorber and formed with a guide collar as well as a support surface for support of the other end of the coil spring, wherein the guide ring has a radially inner collar and a radially outer collar which together define a ring groove therebetween for receiving the roller bearing, whereby the roller bearing is centered on at least one of the collars, with the collars extending at least beyond a midsection of the roller bearing, wherein the radially inner collar is configured for engagement in a recess of the housing.

The present invention resolves prior art deficiencies by incorporating a roller bearing between two carrier elements, which are made of plastic. The use of such carrier elements has weight advantages, when compared with a spring disk, and can be made through an injection molding process on a large scale, resulting in significant cost advantages. Without adversely affecting the strength, the carrier elements can be so constructed as to be optimized with respect to weight, installation space and strength. Suitably, one carrier element represents a housing, which is associated to the coil spring of the suspension strut and includes hollow chambers to realize the weight advantage. The hollow chambers further allow identical wall thickness of the carrier element in all regions. Same cross section avoids varying shrinkage behavior and thus allows maintaining narrow shape tolerances and positioning tolerances. Examples of suitable plastics for the carrier elements include PA 66 GF or PA 66 GB. On the coil spring proximal side, the respective carrier element is provided with a guide collar and a support surface for the coil spring. The support surface of the carrier element is hereby so arranged as to realize a substantial rectilinear force introduction into the suspension strut bearing.

Suitably, the guide collar of the housing has an axial length which exceeds a at least the length extension of one spring winding of the coil spring to thereby realize a sufficient guidance of the coil spring. The end portion of the coil spring has hereby a decreasing winding diameter for surrounding the guide collar of the housing, so that the coil spring is guided longitudinally on the inside of the guide collar and centered at the same time.

According to another feature of the present invention, the housing may have a ring shoulder, which extends inwards from the guide collar. Supported by the ring shoulder is a damping element for providing an elastic end stop for the suspension strut, in a situation, when the vehicle results in a severe spring compression. The ring shoulder may have a circular ring shaped configuration and extends perpendicular to the longitudinal axis of the suspension strut bearing. The configuration of the ring shoulder in conjunction with the guide collar is suitable to realize a disposition of the damping element such that the damping element is held and centered in form-fitting connection upon an inner wall of the guide collar. As an alternative, the damping element may also abut against the ring shoulder and held with play in the guide collar so that an annular gap is formed between the outer surface area of the damping element and the inside wall of the guide collar.

A support of the damping element upon the ring shoulder has the effect that steering forces do not increase excessively, even in extreme situations, i.e., upon a severe spring compression or extreme speed in curves that may lead to a locking of the suspension strut. As a result of the support of the damping element upon the ring shoulder of the housing, which in turn is supported via the roller bearing by the neighboring carrier element, manageable steering forces are encountered, even when the suspension strut locks up.

According to another feature of the present invention, the support surface of the housing may form a stop member for restraining in a simple manner the coil spring against rotation, when assembled. One spring end of the coil spring is hereby supported by the stop member and thus positions the coil spring in the assembled state. The support surface may ascend continuously at an angle in axial direction from the stop member in circumferential direction at least over a 90° area. This angular zone may, optionally, also be extended to a range of greater than 90°. The ascension pattern on the support surface or the angle of inclination corresponds hereby to the end winding of the coil spring. As a consequence, a faulty installation of coil springs having varying spring ends is precluded.

The carrier element associated to the coil spring may further form a ring shoulder which is disposed in radially inwardly offset relationship to the guide collar and provided to support the damping element for the suspension strut. Thus, this carrier element assumes several functions, a fact that is especially advantageous, when installation of the individual components of the suspension strut is involved. As a consequence of the position of the ring shoulder in the housing, which substantially corresponds to the position of the support surface for the coil spring, the damping element can be reduced in size compared to conventional constructions, thereby contributing to a more compact structure of the suspension strut bearing according to the present invention.

According to another feature of the present invention, the housing has a side, which is distal to the support surface for the coil spring and is formed with a circumferential groove for placement of a roller bearing ring. The other bearing ring of the roller bearing is associated to the other carrier element, the guide ring, which is rigidly secured to the body of the vehicle. The guide ring may include hereby two collars for positively retaining the bearing ring therebetween. Both collars have a longitudinal dimension that extends at least beyond the midsection of the roller bearing, when assembled.

According to another feature of the present invention, the radially outer collar of the guide ring may engage, in assembled state, in a recess which neighbors the suspension strut bearing designed as axial bearing. The radially outer collar may include a locking nose for engagement in a radial groove of an outer wall of the housing for realizing a snap connection.

The form-fitting or positive connection of the carrier elements by means of a snap connection disposed between the housing and the guide ring results in a pre-assembled unit in which all components of the suspension strut bearing are joined together. Therefore, the vehicle manufacturer may be supplied with a pre-assembled suspension strut bearing as a unitary structure to thereby significantly reduce the number of components.

According to another feature of the present invention, the snap connection may be constructed to form a labyrinth-type sealing gap. In this way, the suspension strut bearing is protected from ingress of contaminants of all kinds. This benefits the service life of the suspension strut bearing.

According to another feature of the present invention, the hollow chambers of the housing may be spaced about the circumference of the housing. These hollow chambers are so configured to have substantially same cross sections in the housing. As a result, same shrinkage behavior of the housing, made of plastic, is realized throughout, thereby positively affecting the shaping tolerance and positioning tolerance and in general the accuracy in shape or manufacturing tolerance of the entire housing. The hollow chambers also result in a reduction in weight, without adversely affecting the strength. Suitably, the housing has hollow chambers in symmetric relationship, which are separated by intermediate walls radiating toward the middle of the suspension strut bearing so that the hollow chambers exhibit a trapezoidal configuration. It is also possible to provide each hollow chamber with a partition wall to ensure an axial separation of the hollow chambers. Of course, the housing may also include hollow chambers, which are disposed in radially spaced-apart relationship.

According to another feature of the present invention, the hollow chambers of the housing may extend in axial direction up to the guide collar which is provided to support on the outside one end of the coil spring. In this way, the guide collar is ensured to have a same wall thickness, even in the tapered portion thereof to realize an even shrinkage behavior.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 4 is a fragmentary sectional view of yet another embodiment of a suspension strut bearing; and FIG. 5 is a longitudinal section of the suspension strut bearing of FIG. 4.

DETAILED DESCRIPTION OF PREFERRED EMBODIMENTS

Figure 1:
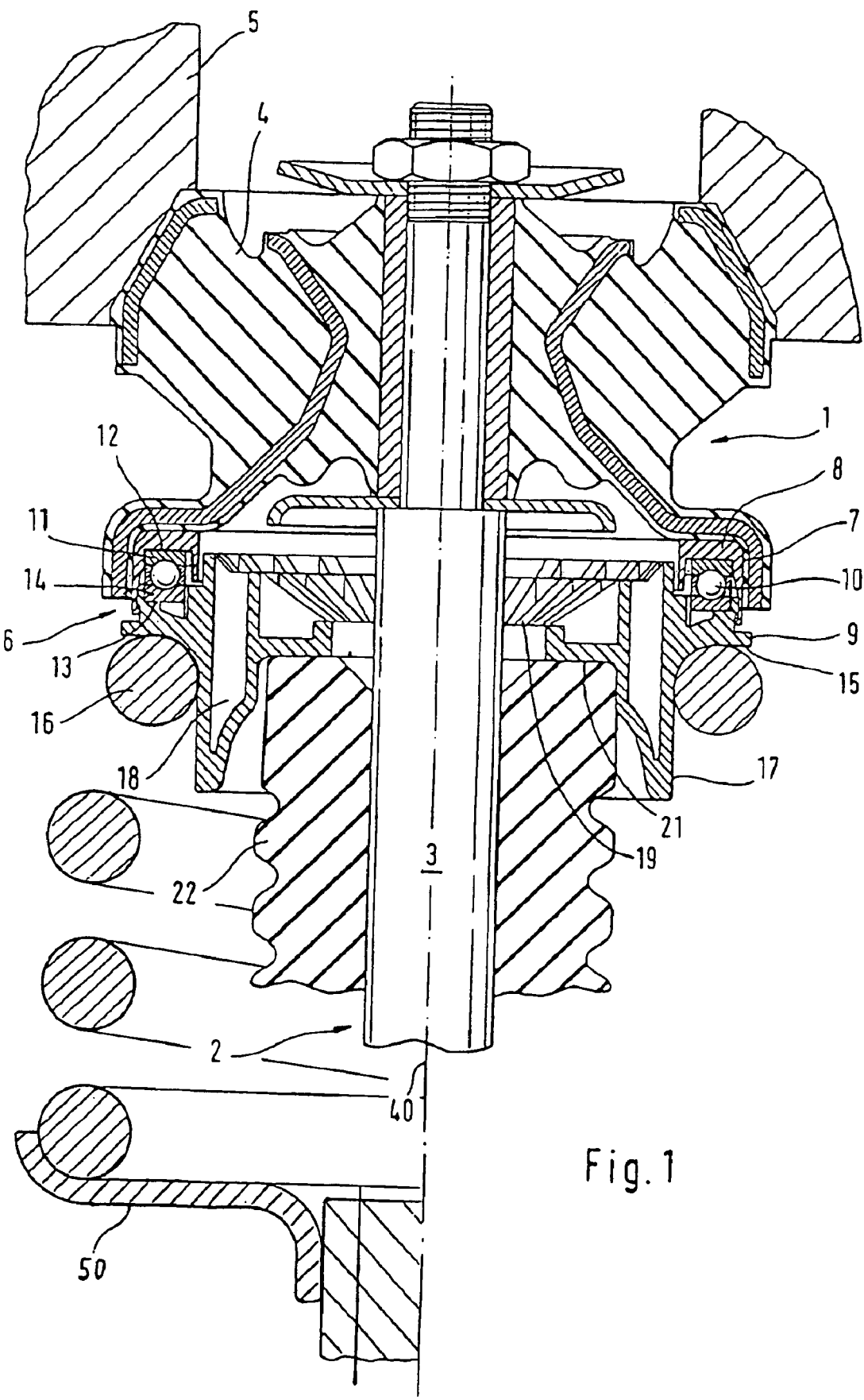
FIG. 1 is a longitudinal section of a suspension strut according to the present invention.

Throughout all the Figures, same or corresponding elements are generally indicated by same reference numerals.

Turning now to the drawing, and in particular to FIG. 1, there is shown a longitudinal section of a suspension strut according to the present invention, generally designated by reference numeral 1. The suspension strut 1 includes a shock absorber 2 having a piston rod 3, which is supported by a vehicle body 5 via an elastic bearing 4. Disposed on the vehicle body distal side of the bearing 4 is a suspension strut bearing, generally designated by reference numeral 6 and positively fitted in a receptacle 7 of the bearing 4. The suspension strut bearing 6 defines a longitudinal axis 40 and includes two carrier elements in the form of a guide ring 8, which abuts against the bearing 4, and a housing 9, which is situated at axial distance to the guide ring 8. A roller bearing 10 is placed between the guide ring 8 and the housing 9 and includes a bearing ring 11, which is received in an annular groove 12 of the guide ring 8, a bearing ring 14, which is received in a circumferential groove 13 of the housing 9, and rolling elements 10' guided between the bearing rings 11, 14.

The housing 9 includes a support surface 15 in axially offset relationship to the circumferential groove 13, for supporting one end of a coil spring 16, whose other end is supported by an abutment 50 of the shock absorber 2. The support surface 15 extends in radial relationship to the longitudinal axis 40 of the suspension strut bearing 6 and connects via a curved transition into an axial guide collar 17. The one end of the coil spring 16 upon the support surface 15 has hereby a decreasing winding diameter for surrounding the guide collar 17 of the housing 9 on the outside, as shown in FIG. 1. The curved transition has a radius that conforms to the spring wire diameter of the coil spring 16. Although not shown in detail, the coil spring 16 is provided with a conical end zone whose end windings abut against the outer surface of the guide collar 17. The support surface 15 is so situated on the housing 9 that a substantial rectilinear force introduction into the suspension strut bearing 6 is established so that the possibility of a tilted disposition is essentially eliminated.

Both, the guide ring 8 and the housing 9, are made of plastic, e.g. PA 66 GF or PA 66 GB, and thus have weight advantages compared to conventional suspension strut bearings. The housing 9 is hereby formed with hollow chambers 18 to thereby prevent different shrinkage behavior as a consequence of changes in wall thickness so as to realize a precise dimensional shape. The hollow chambers 18 have different geometric configurations and are separated from one another by intermediate walls 19.

The housing 9 further includes a ring shoulder 21, which extends radially inwards from the guide collar 17 and is provided for support of a damping element 22 which establishes an elastic end stop for the suspension strut 1, when, for example, a severe spring compression of the vehicle is encountered. The damping element 22 abuts against the ring shoulder 21 and held with play in the guide collar 17, as shown on the left-hand side in FIG. 1. The housing 9 is hereby so configured that the ring shoulder 21 and the support surface 15 are spaced in axial direction from the roller bearing 10 at substantially same distance. Compared to conventional suspension struts, the housing 9 has a compact structure and the damping element 22 can be constructed of reduced length.

Figure 2:
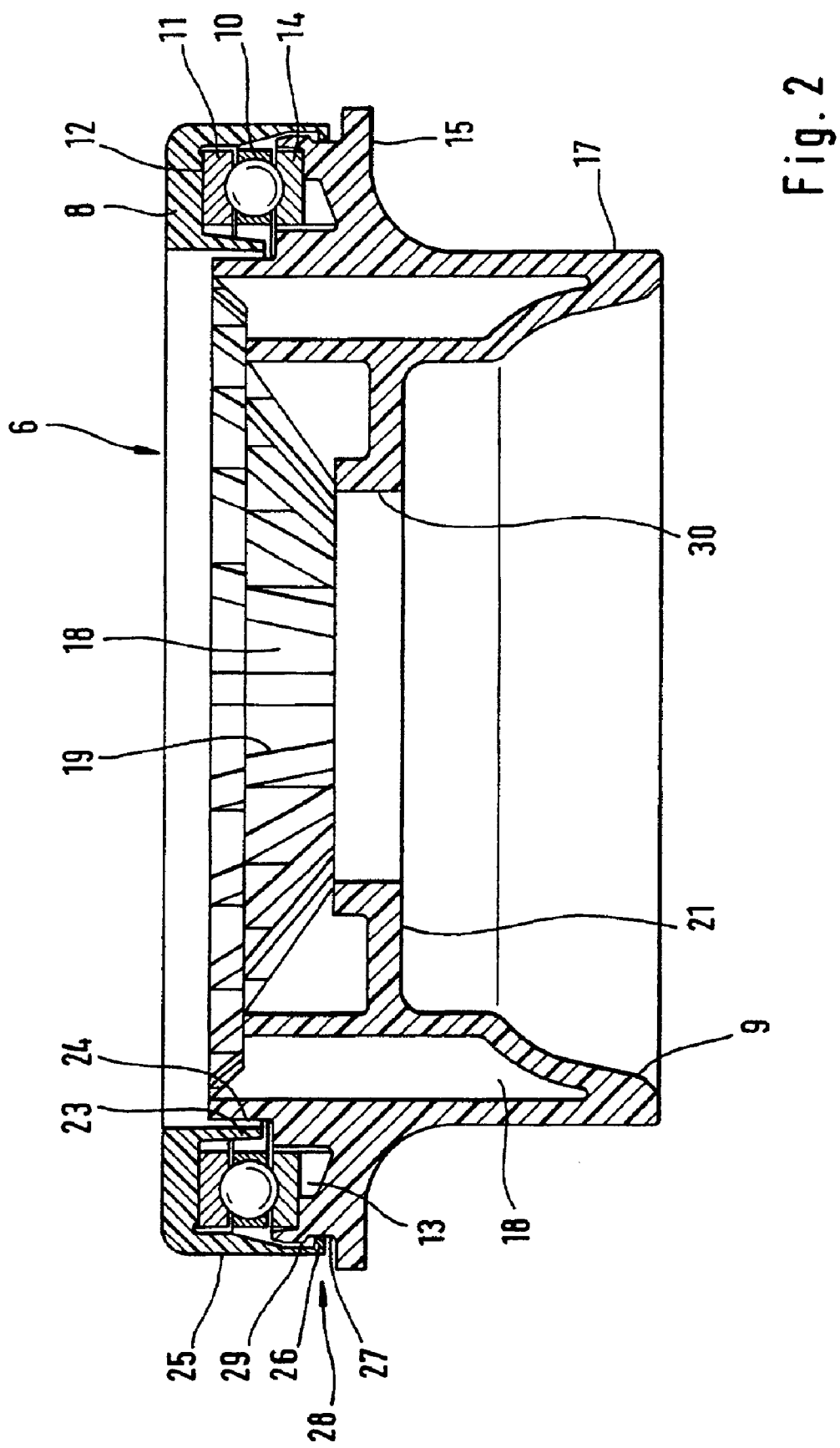
FIG. 2 is a cutaway view, on an enlarged scale, of the suspension strut of FIG. 1, showing in detail a suspension strut bearing for the suspension strut.

FIG. 2 is a cutaway view, on an enlarged scale, of the suspension strut 1, showing in detail the area of the suspension strut bearing 6. The guide ring 8 has a substantially inverted U-shaped configuration and includes a radially inner collar 23 and a radially outer collar 25 which define an annular groove in which the roller bearing 10 is received with play. When the suspension strut bearing 6 is assembled, the inner collar 23 engages in a recess 24 of the housing 9, whereas the outer collar 25 has such a longitudinal dimension as to extend beyond the assembly height of the roller bearing 10 and terminates in a radially inwardly directed projection 26 which engages a radial groove 27 of the housing to thereby form a snap connection, generally labeled by reference numeral 28. The projection 26 has an axial length sufficient to establish the formation of a labyrinth-type sealing gap 29 between the projection 26 and the outer contour of the housing 9. The labyrinth-type sealing gap 29 effectively prevents the ingress of contaminants into the suspension strut bearing 6.

As further shown in FIG. 2, the intermediate walls 19 for lateral demarcation of the hollow chambers 18 are disposed in a radiating manner, thereby defining a trapezoidal configuration of the hollow chambers 18. The hollow chambers 18 are arranged symmetrically about the circumference of the housing 9 and extend from a central cylindrical recess 30 in a direction of a centered middle of the housing 9.

Figure 3:
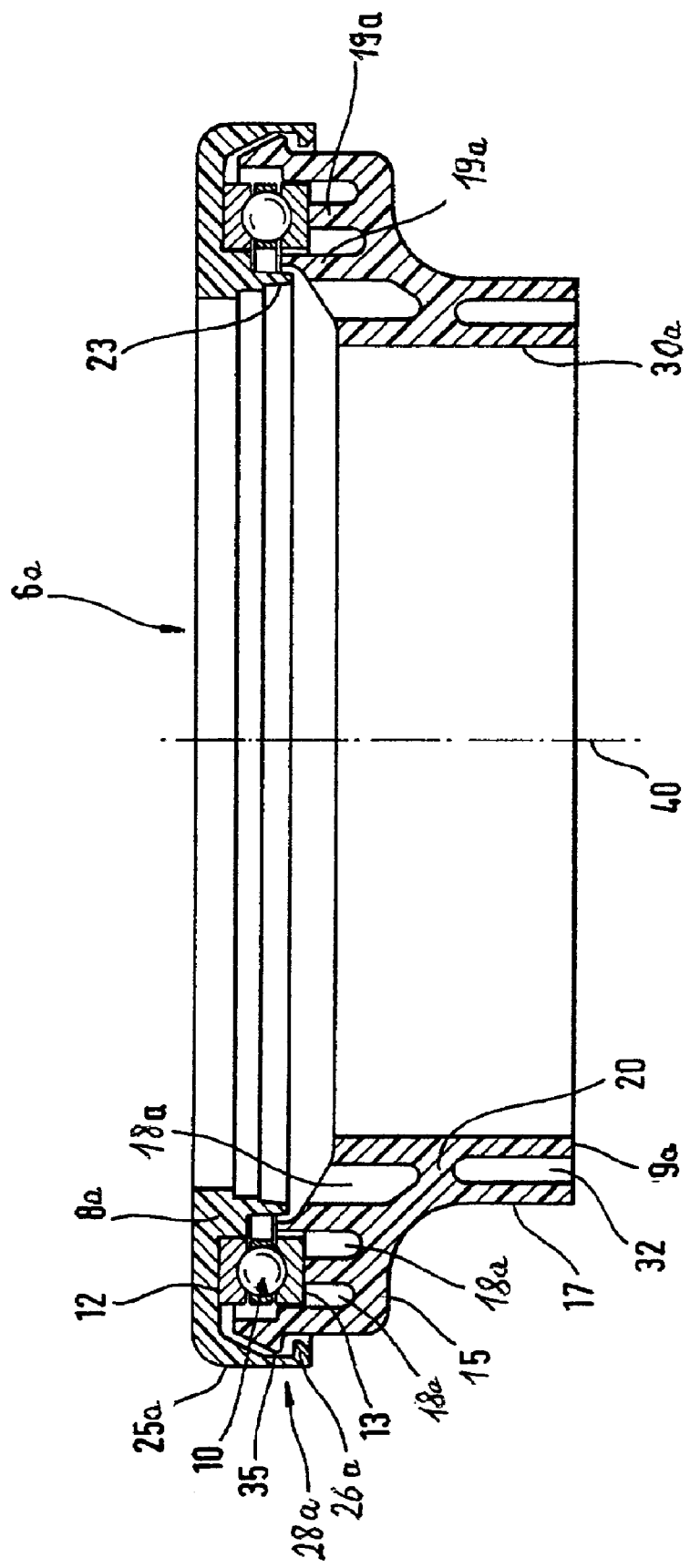
FIG. 3 is a fragmentary sectional view of another embodiment of a suspension strut bearing.

Turning now to FIG. 3, there is shown a fragmentary sectional view of a variation of a suspension strut bearing, generally designated by reference numeral 6*a*. In describing the FIG. 3, like parts of the suspension strut bearing 6*a* corresponding with those of the suspension strut bearing 6 in FIG. 1 will be identified by corresponding reference numerals, followed by the distinguishing character "a" in case corresponding but modified elements are involved, while those parts which are identical to those in FIG. 1 are denoted by same reference numerals and not explained again. The carrier elements, the guide ring 8*a* and the housing 9*a*, are joined together by a snap connection 28*a*. The snap connection 28*a* is implemented by providing the housing 9*a* with a radial circumferential nose 35 which interacts with the radially inwardly directed projection 26*a* of the outer collar 25*a* of the guide ring 8*a*, whereby the projection 26*a* engages behind the nose 35. The housing 9*a* has a central recess 30*a* of greater diameter than the recess 30 of the housing 9 and is formed with hollow chambers 18*a*, 32 of different configurations. The hollow chambers 18*a* are arranged in concentric surrounding relationship to the longitudinal axis 40 of the suspension strut bearing 6*a* and separated from one another by circumferential intermediate walls 19*a*. The hollow chamber 32 is disposed at an axial distance to the radially innermost one of the hollow chambers 18*a* and separated therefrom by a partition wall 20 of the housing 9*a*.

FIG. 4 shows a further variation of a suspension strut bearing, generally designated by reference numeral 6*b*. In describing the FIG. 4, like parts of the suspension strut bearing 6*a* corresponding with those of the suspension strut bearing 6 in FIG. 1 will be identified by corresponding reference numerals, followed by the distinguishing character "b" in case corresponding but modified elements are involved, while those parts which are identical to those in FIG. 1 are denoted by same reference numerals and not explained again. As shown in particular in FIG. 5, the housing 9*b* has hollow chambers 18*b* in concentric surrounding relationship to the longitudinal axis 40 of the suspension strut bearing 6*b* and is formed with a support surface 15*b* which extends from a stop member 42 and ascends continuously at an angle α, for support of the coil spring 16 (not shown here for sake of simplicity). When assembled, the stop member 42 constrains the coil spring 16 against rotation. The angle α is so selected as to conform to the configuration and course of the end winding of the coil spring 16. The support surface 15*b*, which extends from the stop member 42 and rises in axial direction in a helical pattern from the roller bearing 10, is hereby connected to a ring portion 44 of the housing 9*a* by spaced-apart webs 43. The guide ring 8*b* and the housing 9*b* are connected by a snap connection 28*b*, which is implemented by providing the housing 9*b* with a radial circumferential nose 35 which interacts with the radially inwardly directed projection 26*b* of the outer collar 25b of the guide ring 8a, whereby the projection 26b engages behind the nose 35. In this way the snap connection 28b forms a pre-assembled unit which incorporates all components of the suspension strut bearing 6b.

While the invention has been illustrated and described as embodied in an improved suspension strut bearing for a suspension strut, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A suspension strut used in a wheel suspension of an automotive vehicle, comprising:
    a shock absorber;
    a suspension strut bearing defining a longitudinal axis; and
    a coil spring arranged at least in part in coaxial surrounding relationship to the shock absorber and having opposite spring ends, one spring end supported by an abutment of the shock absorber,
    wherein the suspension strut bearing includes a pair of carrier elements made of plastic material, and a roller bearing positioned between the carrier elements, one of the carrier elements configured as a guide ring connected to a body of the vehicle, and the other carrier element configured as a single-piece housing having incorporated therein plural hollow chambers in partial concentric surrounding relationship to the shock absorber and formed with a guide collar as well as a support surface for support of the other end of the coil spring,
    wherein the guide ring has a radially inner collar and a radially outer collar which together define a ring groove sized for receiving the roller bearing with play, whereby the roller bearing is centered on at least one of the collars, with the collars extending at least beyond a midsection of the roller bearing,
    wherein the radially inner collar is configured for engagement in a recess of the housing.

2. The suspension strut of claim 1, wherein the other spring end of the coil spring has a decreasing winding diameter for surrounding the guide collar of the housing on the outside.

3. The suspension strut of claim 1, wherein the guide collar has an axial length which exceeds at least one spring winding of the coil spring.

4. The suspension strut of claim 1, wherein the housing has a ring shoulder which extends inwards from the guide collar.

5. The suspension strut of claim 4, wherein the ring shoulder has a circular ring shaped configuration and extends perpendicular to the longitudinal axis.

6. The suspension strut of claim 5, and further comprising a damping element abutting against the ring shoulder and held in form-fitting connection upon an inner wall of the guide collar.

7. The suspension strut of claim 5, and further comprising a damping element abutting against the ring shoulder and held with play in the guide collar.

8. The suspension strut of claim 4, wherein the ring shoulder is disposed in the housing in substantial axial alignment with the support surface of the housing.

9. The suspension strut of claim 1, wherein the housing has a side which is distal to the support surface for the coil spring and is formed with a circumferential groove.

10. The suspension strut of claim 1, wherein the radially outer collar includes a radially inwardly directed projection for engagement in a radial groove of an outer wall of the housing for realizing a snap connection.

11. The suspension strut of claim 1, wherein the suspension strut bearing is a pre-assembled structure held together by a snap connection between the housing and the guide ring.

12. The suspension strut of claim 11, wherein the snap connection is constructed to form a labyrinth sealing gap.

13. The suspension strut of claim 1, wherein the hollow chambers of the housing are arranged in symmetric relationship.

14. The suspension strut of claim 13, wherein the hollow chambers of the housing are separated by intermediate walls arranged in a radiating manner so as to define hollow chambers of trapezoidal configuration.

15. The suspension strut of claim 13, wherein the hollow chambers of the housing extend in an axial direction to the guide collar.

16. A suspension strut bearing, comprising:
    a housing defining an axis and having incorporated therein plural hollow chambers, said housing including a guide collar as well as a support surface for support of one end of a coil spring of a suspension strut;
    a guide ring connected to a vehicle body and having a radially inner collar, received in a recess of the housing, and a radially outer collar; and
    a roller bearing positioned between the housing and the guide ring and received between the inner and outer collars with play, wherein the collars of the guide ring extend in a direction of the axis at least beyond a midsection of the roller bearing.

17. The suspension strut bearing of claim 16, wherein the guide collar of the housing has an axial length which exceeds at least one spring winding of the coil spring.

18. The suspension strut bearing of claim 16, wherein the housing has a ring shoulder which extends inwards from the guide collar.

19. The suspension strut bearing of claim 18, wherein the ring shoulder has a circular ring shaped configuration and extends perpendicular to the axis.

20. The suspension strut bearing of claim 18, wherein the ring shoulder is disposed in the housing in substantial axial alignment with the support surface of the housing.

21. The suspension strut bearing of claim 16, wherein the housing has a side which is distal to the support surface for the coil spring and is formed with a circumferential groove for placement of a bearing ring of the roller bearing.

22. The suspension strut bearing of claim 16, wherein the radially outer collar includes a radially inwardly directed projection for engagement in a radial groove of an outer wall of the housing for realizing a snap connection.

23. The suspension strut bearing of claim 22, wherein the snap connection is constructed to form a labyrinth sealing gap.

24. The suspension strut bearing of claim 16, wherein the hollow chambers have a trapezoidal configuration.

25. The suspension strut bearing of claim 16, wherein the hollow chambers of the housing extend in an axial direction to the guide collar.

* * * * *